Figure 1D:
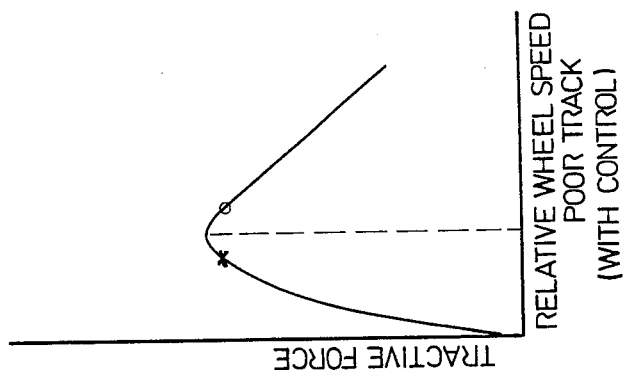

United States Patent [19]

Young

[11] Patent Number: 4,463,289
[45] Date of Patent: Jul. 31, 1984

[54] WHEEL SLIP CONTROL USING DIFFERENTIAL SIGNAL

[75] Inventor: John A. I. Young, Peterborough, Canada

[73] Assignee: General Electric Company, Erie, Pa.

[21] Appl. No.: 429,730

[22] Filed: Sep. 30, 1982

[30] Foreign Application Priority Data

Mar. 11, 1982 [CA] Canada .................................. 398159

[51] Int. Cl.³ .............................................. G06F 15/20
[52] U.S. Cl. ........................................ 318/52; 318/49;
318/69; 318/71; 318/113; 318/376; 318/723
[58] Field of Search .................... 318/52, 6, 49, 69, 71,
318/80, 104, 113, 376, 723; 180/197; 303/94, 95, 96

[56] References Cited

U.S. PATENT DOCUMENTS

| | | | |
|---|---|---|---|
| 3,210,630 | 10/1965 | Zelina | 318/52 |
| 3,663,875 | 5/1972 | Ashiya | 318/52 |
| 3,912,034 | 10/1975 | Pallof | 318/52 X |
| 4,298,940 | 11/1981 | Tadokoro et al. | 318/52 X |
| 4,327,313 | 4/1982 | Tsuboi et al. | 318/52 |
| 4,335,337 | 6/1982 | Okamatsu et al. | 318/52 |
| 4,347,569 | 8/1982 | Allen, Jr. et al. | 318/52 X |

FOREIGN PATENT DOCUMENTS 867519 of 1971 Canada .
961955 of 1975 Canada .
1123496 of 1982 Canada .

Primary Examiner—G. Z. Rubinson
Assistant Examiner—Paul Shik Luen
Attorney, Agent, or Firm—Albert S. Richardson, Jr.

[57] ABSTRACT

Apparatus for controlling wheel slip in a locomotive driven by d.c. motors which receive power from a diesel driven generator, has sensors which provide signals representing speeds of different driven wheels to a velocity unit. The velocity unit derives a differential signal representing the difference between the highest and the lowest wheel speeds. A sensor detects current or power in the generator output and the signal from this sensor is sampled periodically and the latest two sampled values are stored. The sampled values are compared to provide a creep reference signal. The differential signal and the creep reference signal are compared and the resulting difference signal is used to control generator output to maximize current during acceleration.

7 Claims, 6 Drawing Figures

WHEEL SLIP CONTROL USING DIFFERENTIAL SIGNAL

This invention relates to a control which determines a slipping condition of a wheel in a traction vehicle and provides a control signal to prevent or limit slipping.

This invention is particularly suitable for use in a locomotive having a diesel engine which drives a generator to provide electrical power to the driving motors and will be described with reference to such a locomotive.

Wheel slip has always been a problem in locomotive drives and there have been many wheel slip controls developed to reduce or eliminate wheel slip. When a locomotive is accelerating it is desirable to apply power to the driving wheels in such a manner that the wheels are on the verge of slipping at all times but do not actually slip. With varying track conditions and changes in the coefficient of friction between wheel surfaces and track, it is difficult to achieve maximum acceleration without slipping. Many prior art controls apply power to accelerate a locomotive in a steadily increasing manner until the wheels slip and they quickly reduce the power by a predetermined amount sufficient to stop the slipping condition, and then slowly increase the power once more until slipping occurs. The acceleration achieved is reasonably close to maximum.

Another prior art wheel slip control is described in Canadian Pat. No. 1,123,496 to Mark, issued May 11, 1982, and assigned to the Canadian General Electric Company Limited. This wheel slip control derives two signals. One is a signal representing the differential between the highest and lowest wheel speeds, and the other representing the acceleration rate of the wheel with the greatest acceleration. These two signals are added to provide a wheel slip signal whereby the differential signal is modified in accordance with the severity of the slipping condition.

The present invention also makes use of a differential signal but modifies the signal in a different manner to improve the control of wheel slip driving acceleration.

Figure 1C:
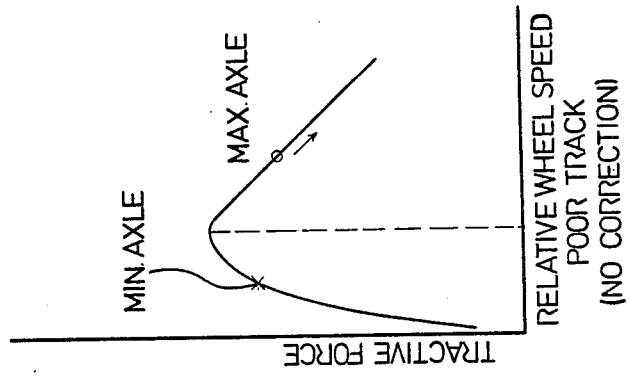
Figure 1B:
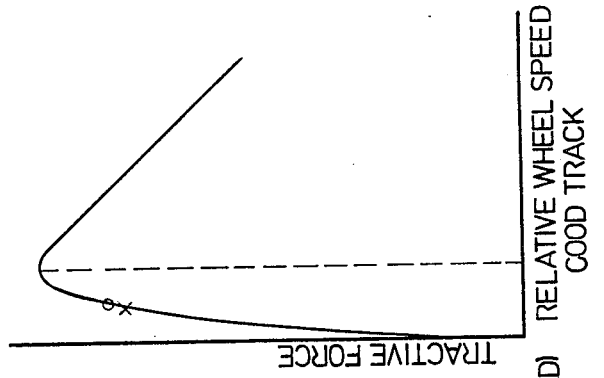
Figure 1A:
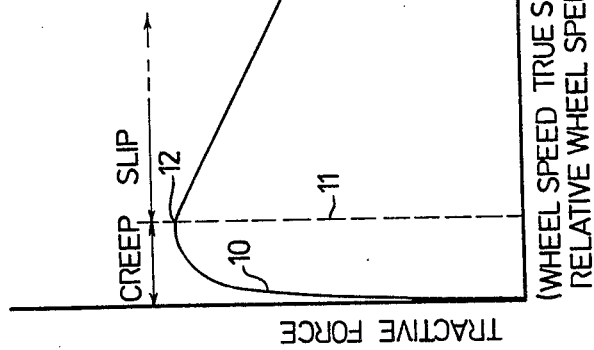
Figure 2:
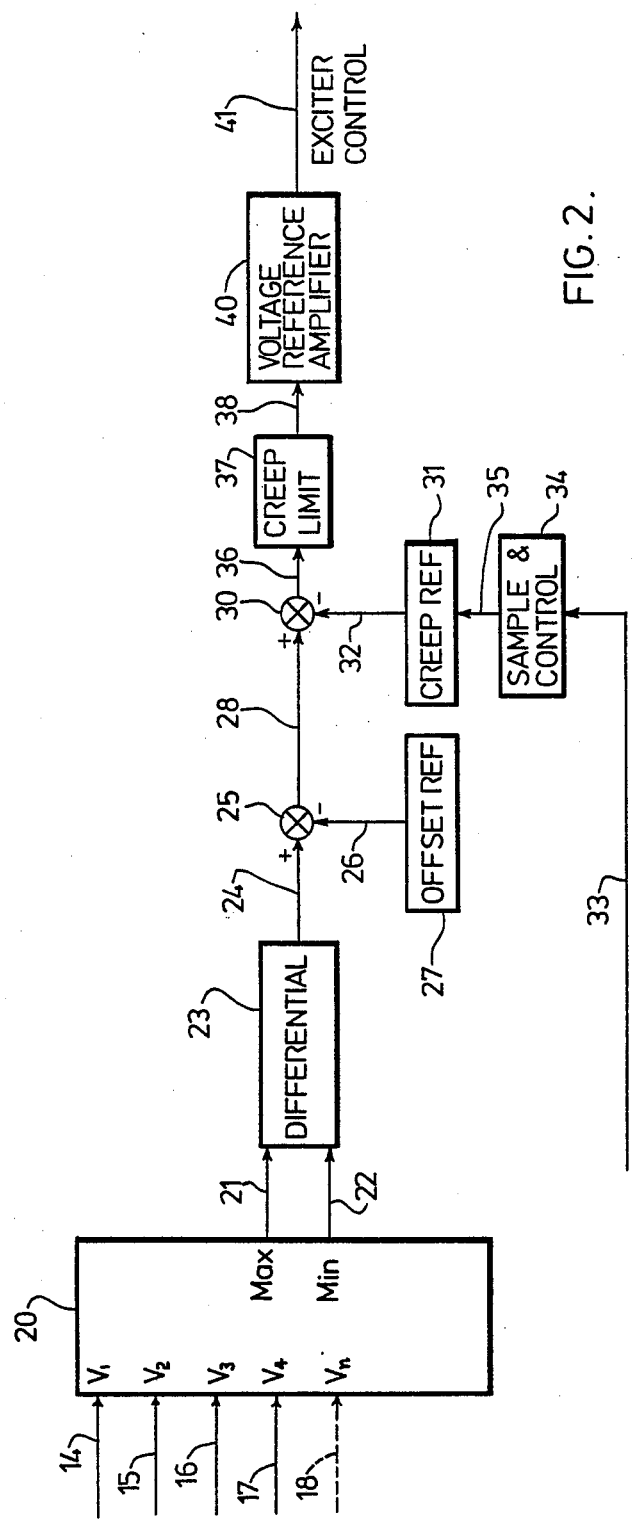
Figure 3:
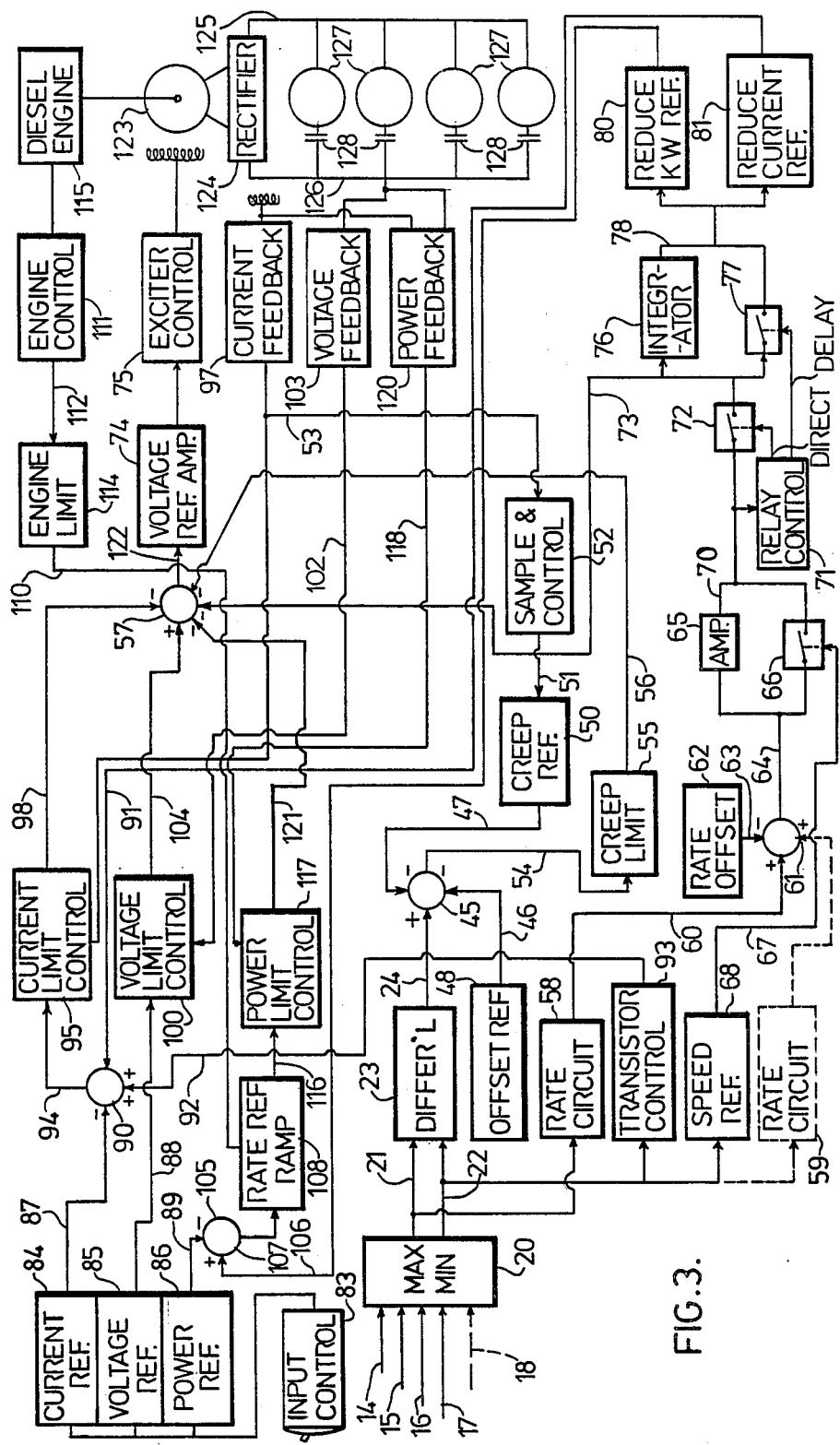

The invention will be described with reference to the accompanying drawings, in which FIGS. 1a, 1b, 1c and 1d are graphs of tractive force plotted against slip, useful in explaining the invention, FIG. 2 is a simplified block schematic diagram showing one form of the invention, and FIG. 3 is a simplified block schematic diagram showing a more complete locomotive control system incorporating the slip control system of the present invention.

Referring to FIG. 1a, the graph shows the tractive force or tractive effort of a locomotive plotted against a value which is the difference between the actual wheel speed of a locomotive and the true wheel speed, i.e., the speed of a wheel which made perfect rolling contact with the rail surface. The value representing the difference between actual wheel speed and true wheel speed is sometimes referred to generally as "slip," but it will be seen that the curve 10 representing the relationship is divided into two portions by a broken line 11. The portion of the curve 10 to the left of line 11 represents "creep" and the portion to the right of line 11 represents "slip." While the difference between actual wheel speed and true wheel speed has often been referred to generally as "slip," there is a distinct difference between "creep" and "slip." The maximum tractive effort that can be obtained is at point 12 where curve 10 and line 11 intersect. It will be seen that creep approaches a maximum as the tractive force increases towards this point, and once slipping begins the tractive force decreases rapidly. For simplicity the difference between actual and true wheel speed is referred to herein as relative wheel speed.

FIG. 1b, which is also a graph of tractive force or tractive effort plotted against relative wheel speed, shows, as an example, a condition which would be normal on a good track. The circle represents the wheel speed or axle speed which is greatest and the cross represents axle speed which is minimum. The two speeds are quite close and conceivably could be the same. However, small differences in wheel diameters and other inconsistencies could result in small differences.

FIG. 1c gives an example of a situation where the track is poor, that is, the coefficient of friction is lower and is perhaps not constant. One set of wheels has started to slip and the axle speed has increased. The minimum axle speed, represented again by a cross, is not associated with a slipping condition, but the maximum axle speed (represented by the circle) has increased and will continue to increase if there is no correction or control.

FIG. 1d represents a situation where the track is poor, slipping has occurred on one set of wheels but a control limits the amount of slipping as is indicated by the position of the circle (maximum axle speed).

Thus, a control system which operates close to point 12 is efficient. The prior art systems which, when maximum tractive effort is desired, control the locomotive drive to apply increasing power until the wheels slip, then reduce power to a point where slipping stops, and again slowly increase it, oscillate around the point of greatest tractive effort. However, if the creep could be increased towards a maximum, i.e., towards point 12, and then maintained as close as possible to point 12 for a relatively long time, then efficiency would be improved.

It is therefore a feature of the invention to provide an improved wheel slip control.

It is another feature of the invention to control the power to the drive wheels to maintain the tractive effort close to a maximum.

Accordingly there is provided apparatus for controlling wheel slip in a locomotive driven by d.c. motors comprising sensor means for sensing the speed of individual wheels driven by respective motors and providing first signals representing individual wheel speeds, comparison means for receiving said first signals and deriving a second signal representing the difference between the highest and the lowest sensed wheel speeds, sensor means for deriving a third signal representing the energy provided to said motors, comparison means for comparing said second and third signals to derive a fourth signal, and means to apply said fourth signal to control electrical power to said motors.

Referring to FIG. 2, signals from sensors normally located on the driving motors (giving motor RPM) which drive respective drive axles provide signals representing respective axle speeds or wheel speeds. It is preferred to sense motor RPM to derive a wheel speed signal because not only does it give greater resolution but also it provides protection should a pinion break. When the sensor is on the motor it will sense motor overspeed if a pinion breaks. In FIG. 2 the sensed speed signals are on respective conductors 14, 15, 16, 17 and 18. These axle or wheel velocity signals are represented by $V_1$, $V_2$, $V_3$, $V_4$ to $V_n$ on respective conductors 14–18. Locomotives generally have 4 axle or 6 axle drives and the use of $V_1$-$V_n$ is only to include all cases. The signals are received by a velocity unit 20 which determines the maximum and the minimum wheel velocities and provides signals representing the maximum and minimum on conductors 21 and 22 respectively. Conductors 21 and 22 are connected to differential circuitry 23 which outputs on conductor 24 a signal representing the difference between the maximum and minimum velocities. This differential signal is applied to adder or adding point 25. Also applied to adding point 25, via conductor 26, is an offset reference signal from offset reference 27. The offset reference signal sets an initial condition. In other words, the offset reference signal eliminates low level differential signals such as could result from unequal wheel diameters or from small differences in creep.

The difference signal from adding point 25 is on conductor 28 and is one input applied to adder or adding point 30. The other signal applied to adding point 30 is a creep reference signal from creep reference 31 over conductor 32. The creep reference signal from creep reference 31 will be altered to a value which represents a maximum creep, that is, it will represent the level or degree of creep that is achieved just before slipping occurs.

It will be apparent that the creep reference must be adjusted to do this and it must change with changing conditions. Thus, there is provided on conductor 33 a signal representing electrical energy, for example, in the form of armature current flowing in the driving motor (or alternatively representing electrical energy in the power). This signal is sampled and retained in sample and control circuitry 34 and applied over conductor 35 to adjust creep reference 31.

The sample and control circuitry 34 periodically samples the current level and stores a value representing current level for a short time. Then circuitry 34 takes another sample and compares it to the stored sample. If the current is increasing, there is no problem and the creep reference can be adjusted appropriately for greater creep. If the current decreases, and it will decrease as slipping occurs, for example, to the right of point 12 in FIG. 1, then the creep reference is adjusted in the other direction. The circuitry 34, in other words, tends to maximize the current in the motors and the current is maximum at point 12 (FIG. 1a) where the maximum tractive effort occurs. It is this maximizing of the current that causes the control to operate around point 12 (FIG. 1a) where it may swing from one side to the other but remains close to point 12 (FIG. 1a) when maximum tractive effort is required.

It will, of course, be apparent that adding points 25 and 30 could be combined. For ease of description in FIG. 2, they have been considered separately.

The difference signal from adding point 30 is on conductor 36 and is limited by creep limit circuit 37. The output of creep limit circuit 37, available on conductor 38, is applied to voltage reference amplifier 40 as a limiting signal. The output of voltage reference amplifier 40 is applied over conductor 41 to an exciter control (not shown) which controls the output of a diesel driven generator to provide power to the driving motors. It will, of course, be apparent that other signals are fed to the voltage reference amplifier 40 to control the generator output. The control shown in FIG. 2 is only to control slip, i.e., to reduce or eliminate slip.

The operation of the control of FIG. 2 in effect maximizes the current (or power). The differential signal provided on conductor 24 is normally a small signal. When the locomotive is moving and no driving power is applied, the differential signal will result only from the small differences in diameters of the wheels. This will also cause a differential signal as power is applied. The greater the speed of the locomotive, the greater will be the difference in wheel speeds caused by different wheel diameters. These small differential signals are eliminated by offset reference 27. The current in the driving motors normally increases with tractive effort and this adjusts creep reference 31 to maximize the current during increasing tractive effort.

When a wheel begins to slip, there is a large increase in the differential signal on conductor 24 and 28. This increases the error or slipping signal on conductor 36 and 38 and results in a reduction in the exciter output. This in turn reduces the driving power and stops the slipping condition. When the slipping stops the differential signal reduces, the error signal on conductor 37 reduces and the limiting signal applied to voltage reference amplifier 40 reduces.

The creep limit 37 limits the level of the differential signal to the level called for by the creep reference. It is desired to maintain operation as close as possible to point 12 (FIG. 1). The creep reference chosen by current (power) maximum will seek the differential that will produce this result. A runaway slipping condition is normally handled by another control as will be described subsequently.

It will be apparent that the simplified control system of FIG. 2 will not respond to a condition referred to as synchronous slip where all the wheels begin to slip more or less simultaneously. This condition is normally handled by a rate circuit or circuits which respond to acceleration.

Referring now to FIG. 3, there is shown, in simplified block schematic form, a locomotive control system incorporating the invention in the form described with reference to FIG. 2. That portion of the diagram relating to the invention will be described first and then the remainder of the diagram will be described briefly.

In FIG. 3, as in FIG. 2, a velocity unit 20 receives signals on conductors 14–18 representing wheel or axle velocities. The velocity unit 20 provides a signal on conductor 21 representing the largest velocity and on conductor 22 representing the smallest velocity. These are applied to differential circuitry 23 which provides on conductor 24 a signal representing the difference between the maximum and minimum wheel velocity signals. The description, which follows, of the circuitry is slightly different from the description relating to FIG. 2 in that, for example, two adding points have been combined. Conductor 24 is connected to adding point 45. Also connected to adding point 45 are conductors 46 and 47 respectively from offset reference 48 and creep reference 50. Offset reference 48 provides a signal which cancels or eliminates low level differential signals. Creep reference 50 provides a signal which in effect adjusts the level of differential signal permitted before power is reduced, that is, it adjusts the level of creep in accordance with a signal applied to creep reference 50 over conductor 51. Conductor 51 is connected to sample and control circuitry 52 and carries a signal to adjust creep reference 50 in response to a signal representing current on conductor 53. As explained before, the adjustment of the creep reference tends to maximize the current when a maximum tractive effort is required. The output signal from adding point 45 is on conductor 54 and it is limited by creep limit circuit 55 and provides a control signal on conductor 56 to main adding point 57.

A rate circuit 58 is connected to conductor 21 and it provides on conductor 60 a signal representing the rate of acceleration of the wheel with the greatest velocity. Conductor 60 is connected to adding point 61 and rate offset circuit 62 is connected by conductor 63 to adding point 61. The signal from rate offset circuit 62 provides a starting level for the rate signal, this is, it cancels lower level rate signals and allows the train to accelerate normally. The output from adding point 61 is on conductor 64 and is applied to amplifier 65 and switch 66 which is preferably a solid state switch 66. The switch 66 is controlled by a speed reference signal on conductor 67 from speed reference 68. Because of the nature of the sensors used to obtain wheel velocity signals, and the rate circuitry 58 which derives from these a rate or acceleration signal, the rate signals tend to be inaccurate at very low wheel velocities. This might cause a false rate signal. Therefore when the wheel velocity is low, the speed reference circuit 68 provides a signal on conductor 67 which closes switch 66 and shorts amplifier 65 thereby clamping or eliminating rate signals on output conductor 70 when the speed is low.

When there is a signal on conductor 70, relay 71 closes switch 72 providing a signal on conductor 73 representing a rate of acceleration over a certain predetermined level. Conductor 73 is connected to main adding point 57 and applies thereto a rate signal. This rate signal is intended to respond to a runaway condition where a wheel is slipping excessively and a large rate signal is applied over conductor 73 to adding point 57 to reduce the voltage applied to voltage reference amplifier 74 and thus reduce the exciter output by exciter control 75.

This is normally sufficient to control both a runaway condition and synchronous wheel slip. If a greater degree of control is required to take care of synchronous slip, another rate circuit 59, shown in broken lines, may be added to the minimum bus 22 and the signals from the two rate circuits added to provide a control signal to reduce exciter output.

Conductor 73 is also connected to an integrator 76 and a switch 77. The integrator 76 integrates the rate signal and provides an integrated output on conductor 78. When there is a rate signal which exceeds the offset from rate offset 62, there is at least one wheel that is in a slipping condition. This signal will operate relay control 71 closing switch 72 and applying a signal to integrator 76. This signal will normally disappear as the slipping is quickly stopped by other portions of the control. However, if slipping starts again as soon as power is applied, this signal will be added by integrator 76. When several such cycles occur the integrated output on conductor 78, which is applied to both circuitry 80 for reducing kilowatt or power reference and to circuitry 81 for reduce current reference, will operate to reduce these reference signals as will be described. The switch 77 is operated by a delayed signal from relay 71 and in effect resets integrator 76.

The remainder of the control system will be described briefly to indicate the manner in which the present invention functions in such a system. An input control 83 is operated or set by an operator and it causes three reference circuits to provide their respective outputs. Current reference 84 provides a current reference signal on conductor 87, voltage reference 85 provides a voltage reference signal on conductor 88, and power reference 86 provides a power reference on conductor 89 (dependent of course on the current and voltage references). The reference signals depend on the position or notch of the input controller 83.

Conductor 87 is connected to adding point 90 and applies a current reference signal to adding point 90. Also connected to adding point 90 are conductors 91 and 92. Conductor 91 is connected to the reduce current reference circuitry 81 already described and applies a signal to adding point 90 when repeated cycles of slipping occur. Conductor 92 is connected to transition control 93. Transition control 93 receives a signal from conductor 22 which represents speed, and in accordance with the speed provides a transition signal on conductor 92 intended to make the transition from one speed to another in a smooth manner, when the motors are switched from series-parallel to parallel for speeds greater than the set point and vice versa for speeds lower than the transition set point speed.

The signal from adding point 90 is on conductor 94 and represents a current reference. This is applied to current limit control 95. Also applied to current limit control 95 via conductor 53 is a signal representing actual current derived by current feedback 97. Current limit control 95 thus receives a reference signal and an actual current signal and provides an error or difference signal, which may be limited by limit circuitry in limit control 95, and this difference signal is applied over conductor 98 to main adding point 57.

Conductor 88 is connected to voltage limit control 100 and provides a voltage reference signal thereto. Also connected to voltage limit control 100 is conductor 102 which carries a voltage feedback signal from voltage feedback circuit 103 representing actual generator output voltage. The voltage limit control 100 thus receives signals representing actual and reference or desired voltage, and it provides a difference or error signal (which may be limited in magnitude by voltage limit control 100) on conductor 104 to main adding point 57.

Conductor 89, carrying a power reference signal, is connected to adding point 105. Also connected to adding point 105 is conductor 106 which carries a signal from reduce power reference (or reduce KW reference) circuit 80. The resulting power reference signal is on conductor 107 and is applied to rate reference ramp 108. The rate reference ramp 108 will set a ramp or rate of increase of power that is suitable for the diesel engine. An engine control 111 provides a signal, preferably based on the diesel governor control, and this is applied via conductor 112 to engine limit circuitry 114. The purpose of engine control 111 and engine limit 114 is to limit the load should the diesel engine 115 be in distress because of some unusual or abnormal operating condition. Normally the control, according to this invention, will minimize the number of times this feature will be required.

The signal from the rate reference ramp 108 is on conductor 116 and is applied as one input to power limit control 117. The other input to power limit control 117 is a power feedback signal on conductor 118 from power feedback circuitry 120. This signal represents actual power at the output of the generator. Thus, power limit control 117 receives a signal representing desired power and one representing actual power, and it provides on conductor 121 an error or difference signal. Power limit control may also limit and/or scale the error signal. Conductor 121 is connected to main adding point 57.

The main adding point 57 provides a signal on conductor 122 to voltage reference amplifier 74 which amplifies and scales the signal and applies it to exciter control 75. This controls the amount of excitation supplied to the field windings of a generator 123 driven by diesel engine 115 to provide electrical energy for an array of traction motors 127. The motors 127 are usually of the direct current (d.c.) type, and their rotors are drivingly coupled by conventional speed-reduction gearing to the respective axle-wheel sets of the locomotive. In practice the generator 123 is an alternator which generates 3-phase alternating voltage, and its output is connected via a rectifying circuit 124 and d.c. conductors 125 and 126 to drive the electric motors 127. Switches or contactors 128 (which are shown symbolically) are provided to switch each motor, when required, from series-parallel arrangement to parallel arrangement across the rectifier. A current sensor 25 supplies the current and power feedback circuits 97 and 120 with signals representative of the magnitude of current that the generator 123 is feeding to the array of motors 127.

It is believed the overall operation of the locomotive control circuit will be understood from the preceding description. Briefly, the input controller 83 provides reference signals representing a desired operation. The voltage, current, and power reference signals are compared to actual voltage, current and power signals as described. The difference between desired and actual signals controls the generator which provides electrical power to the motors to achieve the desired operation. If slipping should occur during acceleration, a signal representing the difference between the fastest and slowest wheel speed is compared with a creep reference signal and the result of this comparison is used to reduce the signal which controls generator excitation. The creep reference signal is adjusted in accordance with generator current (or power) to maximize current during application of driving power (i.e., increasing tractive effort).

The embodiments of the invention in which an exclusive property or privilege is claimed are defined as follows:

1. Apparatus for controlling wheel slip in a locomotive driven by d.c. motors comprising
   sensor means for sensing the speeds of individual wheels driven by respective motors and providing first signals representing individual wheel speeds,
   first comparison means for receiving said first signals and deriving a second signal having a value representing the difference between the highest and lowest sensed wheel speeds,
   means for deriving a third signal having a value that is adjusted in response to changes in the amount of energy provided to said motors,
   second comparison means for comparing said second and third signals to derive a fourth signal representative of the difference between the values of said second and third signals, and
   means to apply said fourth signal to control electrical power to said motors in a manner that reduces power as said second signal increases beyond a value determined by the value of said third signal.

2. Apparatus as defined in claim 1 in which said means for deriving said third signal includes means for sensing current provided to all of said motors and in which the value of said third signal is increased if the current level is increasing.

3. Apparatus as defined in claim 2 in which said means for deriving said third signal includes means for periodically sampling and storing the level of said current
   and for comparing the latest current sample with the preceding stored sample to determine if the current level has increased or decreased, said third signal being a creep reference based on the comparison of said two samples.

4. Apparatus for controlling wheel slip in a locomotive having d.c. drive motors and a diesel driven generator providing electrical power to said drive motors, comprising
   sensor means for sensing the speed of individual wheels driven by respective ones of said motors and providing first signals representing the speed of individual wheels,
   a velocity unit for receiving said first signals and providing a second signal representing the difference between said first signal representing the highest wheel speed and said first signal representing the lowest wheel speed,
   sensor means for sensing the current provided to said motors and providing a third signal representing the level of said current,
   sample means for periodically sampling said third signal and storing the latest sampled value and the preceding sampled value and providing a fourth signal based on a comparison of the two sampled values of said third signal,
   creep reference means receiving said fourth signal and providing as a reference signal a fifth signal based on said fourth signal,
   adding means for adding said second signal and said fifth signal and deriving therefrom a sixth signal, and
   means responsive to said sixth signal for controlling the generator output to maximize current output during acceleration.

5. Apparatus as defined in claim 4 and further comprising
   offset reference means for eliminating any portion of said second signal below a predetermined level.

6. Apparatus as defined in claim 5 and further comprising
   limit means for limiting the sixth signal to values below a predetermined level to reduce excessive changes.

7. Apparatus as defined in claim 6 and further comprising
   a rate circuit for receiving said first signal representing said lowest wheel speed and providing a signal representing wheel acceleration, and
   means responsive to said signal representing acceleration exceeding a predetermined level to reduce the generator output.

* * * * *

UNITED STATES PATENT AND TRADEMARK OFFICE
CERTIFICATE OF CORRECTION

PATENT NO. : 4,463,289

DATED : Jul. 31, 1984

INVENTOR(S) : John A. I. Young

It is certified that error appears in the above-identified patent and that said Letters Patent is hereby corrected as shown below:

Front page, item 73, change the Assignee from "General Electric Company, Erie, Pa." to -- Canadian General Electric Company Limited, Toronto, Ontario, Canada --

Signed and Sealed this

Eighth Day of January 1985

[SEAL]

*Attest:*

*Attesting Officer*

GERALD J. MOSSINGHOFF

*Commissioner of Patents and Trademarks*